US011889295B1

(12) United States Patent
Aldalbahi et al.

(10) Patent No.: US 11,889,295 B1
(45) Date of Patent: Jan. 30, 2024

(54) DIGITAL COMPASS FOR MULTI-USER INITIAL ACCESS IN MILLIMETER-WAVE CELLULAR NETWORKS

(71) Applicant: KING FAISAL UNIVERSITY, Al-Ahsa (SA)

(72) Inventors: Adel Aldalbahi, Al-Ahsa (SA); Mohammed A. Jasim, Al-Ahsa (SA); Nazli Siasi, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/132,359

(22) Filed: Apr. 7, 2023

(51) Int. Cl.
*H04W 48/16* (2009.01)
*H04B 7/0404* (2017.01)
*H04B 7/06* (2006.01)

(52) U.S. Cl.
CPC .......... *H04W 48/16* (2013.01); *H04B 7/0404* (2013.01); *H04B 7/0617* (2013.01)

(58) Field of Classification Search
CPC .... H04W 48/16; H04B 7/0404; H04B 7/0617
See application file for complete search history.

(56) References Cited

U.S. PATENT DOCUMENTS

| 8,989,770 | B2 | 3/2015 | Lee et al. |
| 10,321,428 | B2 | 6/2019 | Zhong et al. |
| 10,736,074 | B2 | 8/2020 | Edge et al. |
| 11,317,414 | B2 | 4/2022 | Sadiq et al. |
| 11,438,865 | B1 | 9/2022 | Donnellan |
| 2013/0039239 | A1* | 2/2013 | Lin .................. H04W 52/0229 370/311 |
| 2018/0227024 | A1* | 8/2018 | Xia ........................ H04B 7/0695 |
| 2019/0306726 | A1* | 10/2019 | Mo ....................... H04B 7/0404 |
| 2020/0136696 | A1* | 4/2020 | El-Rayis .............. H04B 7/0404 |
| 2020/0403687 | A1* | 12/2020 | Raghavan ............. H04W 8/005 |
| 2022/0124668 | A1 | 4/2022 | Barbu et al. |
| 2022/0271818 | A1 | 8/2022 | Svendsen et al. |

(Continued)

FOREIGN PATENT DOCUMENTS

| JP | 4186355 B2 * | 11/2008 | ........... H04B 7/0491 |
| KR | 20160049759 A * | 5/2016 | ........... H04W 48/16 |
| WO | 2022016335 A1 | 1/2022 | |

OTHER PUBLICATIONS

B. Fisher, Bluetooth Data Transfer: Transfer Data between Phones via Bluetooth, https://www.iskysoft.com/phone-transfer/bluetooth-data-transfer.html, 5 pages, Jun. 2022 (Year: 2022).*

(Continued)

*Primary Examiner* — Bernarr E Gregory
*Assistant Examiner* — Fred H Mull
(74) *Attorney, Agent, or Firm* — Nath, Goldberg & Meyer; Richard C. Litman

(57) ABSTRACT

The initial beam access method for a mobile station in a mmWave cellular network having a base station and multiple mobile stations includes a method having steps of probing a channel for information about the base station from the multiple mobile stations; receiving information from the multiple mobile stations on the direction of the base station in relation to a reference point; and adjusting the direction of the base station based on the received information and the reference point using a digital compass.

10 Claims, 6 Drawing Sheets

(56) References Cited

U.S. PATENT DOCUMENTS

2022/0294495 A1* 9/2022 Chen .................. H04B 7/0404

OTHER PUBLICATIONS

Digital Compass, GSMfind, https://gsmfind.com/glossary/digital-compass.html, 3 pages (Year: 2023).*
Gartner Glossary: Magnetometer, Gartner, https://www.gartner.com/en/information-technology/glossary/magnetometer, 5 pages (Year: 2023).*
Aldalbahi, "Link Recovery Scheme for Multi-Point mmWave Communications", Electronics 9.1 (2019) : 50.
Attaoui et al., "Initial Access & Beam Alignmment for mmWave and Terahertz Cmmunications", IEEE Access (2022), vol. 10, pp. 35363-5397.
Aldalbahi et al., "Digital compass for multi-user beam accessin mmWave cellular networks", Digital Communications and Networks (2022), doi: https://doi.org/10.1016/j.dcan.022.10.024.

* cited by examiner

DIGITAL COMPASS FOR MULTI-USER INITIAL ACCESS IN MILLIMETER-WAVE CELLULAR NETWORKS

BACKGROUND

1. Field

This disclosure relates to initial beam access in a Millimeter-Wave (mmWave) cellular network using a digital compass.

2. Description of the Related Art

Millimeter wave (mmWave) technology has emerged as a major component of 5G networks due to its contiguous abundant channelization, and thus its ability to provide high data rates. The International Telecommunication Union's IMT-2020 group, along with the 3GPP specifications, set the first Phase of 5G cellular networks, known as 5G new Radio (NR). The NR is composed of sub-6 GHz frequencies operating on traditional microwave bands, termed as FR1 and mmWave bands that are above 6 GHz. Hence 5G is classified as either standalone (SA), i.e., operating on mmWave bands only, or non-standalone (NSA), i.e., operating on mmWave and microwave bands. The initial phase also specifies requirements on ultra-reliable and ultra-low latency communication (URLLC), and enhanced mobile broadband (eMBB), i.e., 1 ms latency requirements and theoretical peak download (DL) rates of 20 gigabits (Gbps).

However, mmWave technology suffers from various limitations. Foremost among these is path loss (PL) due to the short wavelength ranges (5-10 mm). Additionally, this small operating wavelength yields reduced antenna apertures, and thus reduces captured energy. Note that the small wavelength here can be beneficial for use of small cells and interference mitigation. Moreover, the large channelization at mmWave bands ranging between 500 MHz and 1 GHz yields increased noise bandwidths. Since the noise power spectral density is constant, therefore, when it is scaled by the large channel bandwidth, then it results in large noise power. Note that this noise cannot be compensated by transmitting higher power levels due to RF exposure regulation and safety regulations.

In light of the above, antenna arrays and beamforming architectures have been a major component for mmWave transceivers, due to the highly aggregated link gains achieved here (e.g., 20-30 dBi when using a uniform linear array of 15 microstrip antennas). These gains compensate for the aforementioned limitations, i.e., path and penetration losses, and noise bandwidth.

However, beamforming architectures result in directional transmission and reception at the mobile station (MS) and base station (BS), i.e., absence of omni-directional transmission mode. This results in concentrating energy in certain directions and increase of aperture effective areas, i.e., increasing received power levels. Namely, the mmWave channel is expected to vary in fractions of seconds (in the order of microseconds). For instant high Doppler spreads of MS along with small coherence times, mmWaves can experience drastic time varying channels, more than the variations experienced in today's networks, which results in complex channel tracking requirements.

Furthermore, fog networks have been proposed as a potential candidate for cloud radio access networks for future cellular networks. Fog nodes (APs) enable small cell implementation, where these APs are at short-proximity and low powered. They are capable of interconnecting thousands of devices (enabling IoT) while boosting capacities and reducing latencies. These APs also provide a significant amount of storage and computation features as well. Hence, it is projected that mmWave communications will be merged with fog computing for the support of future cellular networks. These APs deploy directional transmission in terms of beamforming to communicate with various devices (e.g., MS). One major challenge here is initial beam access (beam acquisition) and beam adaptation between these APs and the MSs. Thus, a system and method for initial beam access in a millimeter wave cellular network solving the aforementioned problems is desired.

SUMMARY

Beamforming in standalone Millimeter-Wave (mmWave) networks yields prolonged access times due to the complex and high number of measurements required to determine the optimal beam directions returning the highest signal level at Mobile Station (MS) and Base Station (BS). Therefore, dynamic and fast access schemes that meet the Third-Generation Partnership Project (3GPP) specifications are required here. The present initial beam access in mmWave cellular networks scheme is proposed for multiple MS users by leveraging a digital compass in the access procedure. When a new MS joins the footprint of a BS, it probes the channel for beacon signaling about the BS direction, i.e., directions broadcast by neighboring MSs that have completed beam association at previous time steps. Then, a digital compass is utilized to adjust the coordinates of the BS according to the location of the new MS. This can be applied to single and multi-user settings in various broadcasting modes, e.g., to a single connected MS user that broadcasts information to a single incoming MS user, to a single user that broadcasts signals to multiple incoming users, or to all multiple associated users broadcasting to multiple incoming users. The results yield notable efficiency in terms of the computational complexity, access times, and power and energy consumption, limited by the determinant of increased cost.

An initial beam access method for a mobile station in a mmWave cellular network having a base station and multiple mobile stations may, in one embodiment, include probing a channel for information about the base station from the multiple mobile stations; receiving information from the multiple mobile stations on the direction of the base station relative to a reference point; and adjusting the direction of the base station based on the received information and the reference point using a digital compass.

Probing the channel can include probing for beacon signals from the multiple mobile stations about the base station direction. The probing channel may use a low-power omni-directional signal. Receiving information can include receiving information broadcast on the channel from neighboring mobile stations about the direction of the base station. The reference point can be the north magnetic field direction. Adjusting the direction of the base station can include adjusting at a beamformer using positional information of the mobile station. The positional information can be at least one or more of the azimuth, tilt, horizontal plane, accelerometer rotation angles, roll and pitch angles, azimuth error, inclination angle of the magnetic vector, and roll and pitch angle errors.

In another embodiment, an initial beam access device for a mobile station in a mmWave cellular network having a base station and multiple mobile stations may include an output probing a channel for information about the base station from the multiple mobile stations; an input receiving information from the multiple mobile stations on the direction of the base station relative to a reference point; and a beamformer adjusting the direction of base station based on the received information and the reference point using a digital compass.

The output can probe for beacon signals from the multiple mobile stations about the base station direction. The output can probe the channel using a low-power omni-directional signal. The information received at the input can be broadcast information about the direction of the base station. The reference point can be the north magnetic field direction. The beamformer can adjust the direction of the base using positional information of the mobile station. The positional information can be at least one or more of the azimuth, tilt, horizontal plane, accelerometer rotation angles, roll and pitch angles, azimuth error, inclination angle of the magnetic vector, and roll and pitch angle errors.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
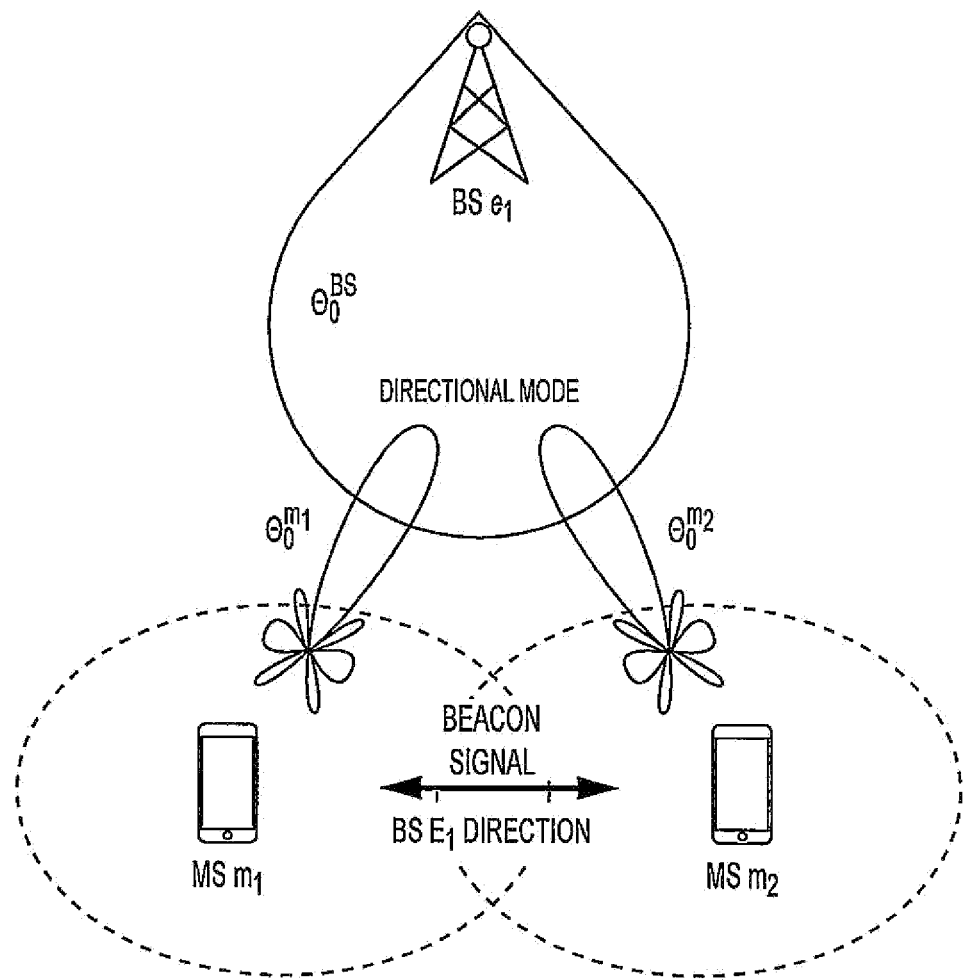
FIG. 1 is a schematic diagram of an architecture for establishing initial beam access in a mmWave cellular network.

Beamforming in standalone Millimeter-Wave (mmWave) networks yields prolonged access times due to the complex and high number of measurements required to determine the optimal beam directions returning the highest signal level at a Mobile Station (MS) and Base Station (BS). Therefore, dynamic and fast access schemes that meet the 3GPP (Third-Generation Partnership Project) specifications are required. A digital compass present in mmWave networks can be utilized in the initial access procedure for multiple MS users to meet the 3GPP demands.

In mmWave communication networks, the short wavelength of mmWave signals may result in severe path loss, particularly with low power omnidirectional signals. The typical mmWave signal has short range, typically on the order of about two hundred meters, depending on power loss in the path due to absorption by tall foliage, hills, buildings, or other obstacles and meteorological or atmospheric conditions. Hence, mmWave cellular networks tend to rely on multi-element beamformer arrays. Although beam antennas result in a directional signal, they may result in a signal reaching the base station with more power, resulting in a more stable and efficient communications link once the beam directions are properly aligned. One problem is that mobile stations newly entering a base station coverage area may not know the proper settings for aligning their beam signal with the base station, and broadcasting a short range omnidirectional signal in an effort to locate the base station may require a significant period of time and volume of transmissions, resulting in inefficient use of the bandwidth. Hence, there is a need for an efficient system and method for quickly establishing a stable communications link between a base station and mobile stations newly entering the coverage area of the base station.

In the present initial beam access in a mmWave cellular network, when a new MS joins the footprint of a BS, it probes a channel for beacon signaling about the BS direction using a low-power omni-directional signal, i.e., broadcast by neighboring MSs that have completed beam association at previous time steps. Existing MSs already in the network broadcast to the new MS, by sharing the BS coordinates in relation to the north magnetic field direction (as a reference point). The new MS adjusts its direction according to the reference point using a digital compass, which eliminates beam search, resulting in fast access time at reduced energy consumption. The digital compass is utilized to finally adjust the coordinates of the BS according to the location of the new MS.

Electronic (digital) compasses are compact solutions for directional findings, used in mobile phones and clocks, typically composed of multiple sensors built using Micro-ElectroMechanical Systems (MEMS) technologies, while alternative technologies that include GPS may be subject to coverage limitations and prolonged signaling delays. The compass includes magnetometer sensors that measure the response of the MS to the earth's magnetic field, an accelerometer sensor to measure linear acceleration, and a gyroscope sensor to measure rotational velocity.

The foregoing is used in single and multi-user settings in various broadcasting modes, such as (i) a single connected MS user that broadcasts information to a single incoming MS user, (ii) a single user that broadcasts signals to multiple incoming users, or (iii) all multiple associated users broadcast to multiple incoming users. The system and method yields notable efficiency in terms of computational complexity, access times, and power and energy consumption, at the determinant of increased cost.

When a new MS joins a network, it probes a channel for information about the BS direction using a low-power omnidirectional signal. Then, existing users broadcast (to the new MS) the BS coordinates in relation to the north magnetic field direction (reference point). Then the new MS adjusts its direction according to the reference point using a digital compass that matches the reference point with the MS orientation and acceleration.

Each MS device has an omnidirectional antenna for broadcasting with nearby users, and a beamforming array to communicate with the BS. Once the optimum BS directions are determined at a MS, adjacent MS users use it to set their beam directions, based on one of two broadcasting modes. To adjust the direction at the user beamformer, key models are developed to gauge the azimuth bearing, tilt error, horizontal plane components, accelerometer rotation angles, roll and pitch angles, azimuth error that includes heading errors due to the MS orientations, the inclination angle of the magnetic vector, and the roll and pitch angle errors.

An electronic compass is used to determine the optimum direction for mobile station $m_2$'s beamforming vector $\Theta_0^{m_2}$ without the need for beam scanning. This direction returns the highest signal level along the new MS orientation for communicating with the BS. The beamforming vector can be expressed as follows:

$$\Theta_0^{m_2} = [\varphi_{comp} - z_d] \pm \Delta\alpha, \quad (1)$$

where $\varphi_{comp}$ and $\Delta\alpha$ are the compass azimuth bearing and the azimuth tilt error, and $z_d$ is the control signal that carries $m_1$ coordinates, respectively.

Figure 2:
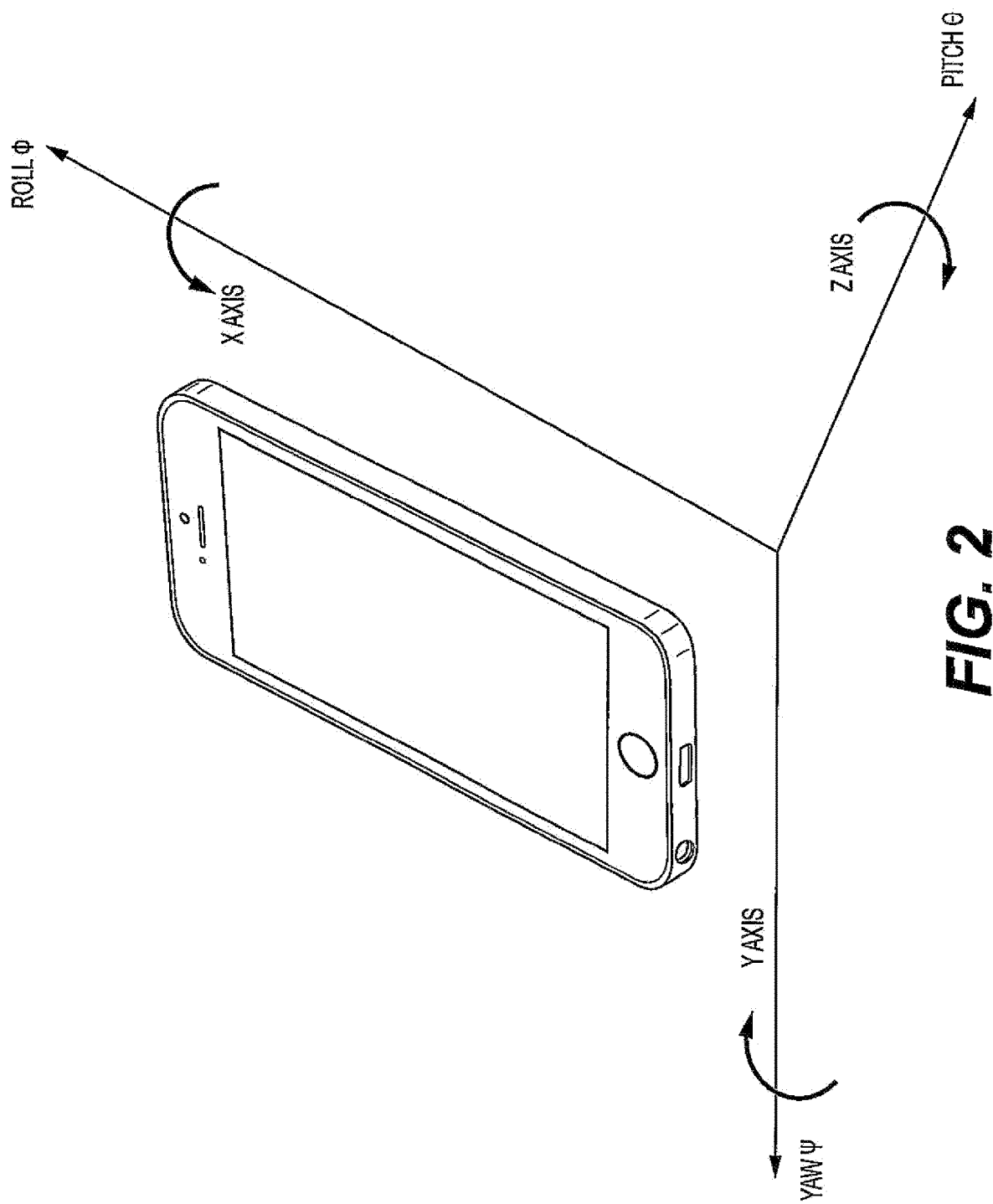
FIG. 2 is a schematic diagram showing parameters of a Mobile Station (MS) Accelerometer Orientation in a mmWave cellular network.

The compass azimuth bearing (direction) is determined by the magnetic field component parallel to the earth's surface, i.e., always pointing towards magnetic north. Namely, this variable is gauged using equation 2, discussed below.

$$\varphi_{comp} = \begin{cases} 90° - \arctan\left(\frac{H_x}{H_y}\right)\frac{180}{\pi}, & H_y > 0 \\ 270° - \arctan\left(\frac{H_x}{H_y}\right)\frac{180}{\pi}, & H_y < 0 \\ 180°, & H_y = 0, H_x < 0 \\ 0°, & H_y = 0, H_x > 0 \end{cases} \quad (2)$$

where $H_x$, $H_y$, are the horizontal plane components of the earth's magnetic, along the x, y, magnetic fields determined by the following rotation equations discussed below, i.e., $$H_x x \cos \phi + y \cos \theta \sin \phi - z \cos \theta \sin \phi H_y = y \cos \theta + z \sin \theta \quad (3)$$

where $\theta$ and $\phi$ are the accelerometer rotation angles, i.e., roll and pitch angles, respectively, as illustrated in FIG. 2.

Azimuth errors arise from the computation of the H x and H y components using the magnetoresistive sensors, which requires implicit knowledge of the horizontal or vertical plane. Errors occur due to the requirement for constant computation of the sensor attitude to correct the measured magnetic values, i.e., tilt compensation. This is referred to as the azimuth error, $\Delta\alpha$, that accounts for compass heading errors due to the MS (sensor) various tilt orientations, see equation (4) below, i.e., $$\Delta\alpha = -(\Delta\theta)\tan \delta \cos \alpha - (\Delta\phi)\tan \delta \sin \alpha \quad (4)$$

where $\delta$ is the inclination angle of the magnetic vector, $\Delta\theta$ is the roll angle error, i.e., $\theta \in [-\pi, \pi]$, and $\Delta\phi$ is the pitch angle error, i.e., $\phi \in [-\pi/2, \pi/2]$. This setting yields tilt-corrected magnetic values in computing the principal value of the compass bearing. Note that the new MS probes the channel for beacon signals for $t_{prob}$ time that is much less than the time required for beam access. Therefore if no beacon signals are recorded, then conventional iterative beam scanning can be initiated.

The new MS $m_2$ now associates its position with the BS and is at a separation distance of $d(m_2, BS)$ from the BS. Once the new MS $m_2$ computes the direction for its beamforming vector, the transmitted uplink control signal from the new MS $m_2$ to the BS, $U(m_2)$, is formulated as, $$U(m_2) = \sqrt{pt(m_2)} \, p_{BS}^H(\Theta_0^{BS}) H(m_1, BS) v(\Theta_0^{m_2}) X(m_1) + p_{BS}^H(\Theta_0^{BS}) w \quad (5)$$

where $pt(m_2)$ (in dBm) is the average of the transmitted power from $m_2$, $$p_{BS}(\Theta_0^{BS}) \text{ and } v(\Theta_0^{m_2})$$

represent the response vectors at the BS and MS at $$\Theta_0^{m_2}$$

and $$\Theta_0^{BS}$$

angles, respectively, and $H(m_2, BS)$ is the geometric channel, $$H(m_2, BS) = \sqrt{\frac{N_{BS} N_{m_1}}{\Gamma_{PL}}} \sum_{k=1}^{K} \sum_{l=1}^{L} h_l P_{BS} V_{m_2}^H \quad (6)$$

Following this process, the MS $m_2$ now completes the control plane and initiates the data plane on the established optimum beam direction.

FIG. 1 is an illustration of the architecture for a mmWave cellular network. The first layer includes multiple MS terminals. They communicate with an intermediate layer that includes multiple nodes that act as a gateway to the base station.

The MS terminals demand various services of different delay and capacity specifications. They can be mobile stations, sensors, vehicles, desktops, laptops, etc., which are distributed across nodes in the intermediate layer. The MS terminals communicate with the base station through nodes in the intermediate layer. The base station 225 includes many resources and network functions (NFs) that can be offloaded to nodes via fronthaul links.

Signal broadcasting between and among MS terminals includes information about the best beam directions that yields the highest signal levels, where existing users broadcast information to new users. The broadcasting of the best beam directions is applied to both single MS users and multiple users, where two broadcasting approaches are used for the latter. In a single broadcasting approach, one MS transmits beacon signals to all devices. In a multi-broadcasting approach, all devices transmit beacons to other MSs. Further, a digital compass is used to adjust the beam directions along with the MS orientation and acceleration. Overall, the user density includes a single primary user $m_1$ in the network, a second MS $M_2$, and multiple M users that all aim to access the network.

Different access procedures are used when any single MS $m_i$ enters the coverage zone of a BS network through transition from sleep to idle or active modes to mobility, depending on the number of MS users M that are normally distributed in a cluster (cell) served by a mmWave BS. In one method, MS $m_i$ can iteratively scan the spatial directions for the best beamforming direction using RF chain r1 (Transceiver 1). This presents a worst-case scenario, where the MS joins the network and cannot find a beacon signal, therefore it starts beam scanning to establish the directions with the BS. In another method, MS $m_i$ probes for beacon signaling radiated by other associated users at proximity using RF chain r2 (Transceiver 2), thus avoiding exhaustive or iterative beam scanning procedures.

Beacon transmission from a MS terminal to multiple MSs can be extended for multiple MS users M–$m_1$ that exist in the proximity of the associated primary MS $m_1$ with the BS, where each MS $m_i \in$ M is at d($m_i$, $m_1$) separation distance from $m_1$. There are two modes of data dissemination to the multiple MS users, termed as the single-broadcasting and multi-broadcasting approaches.

Figure 6:
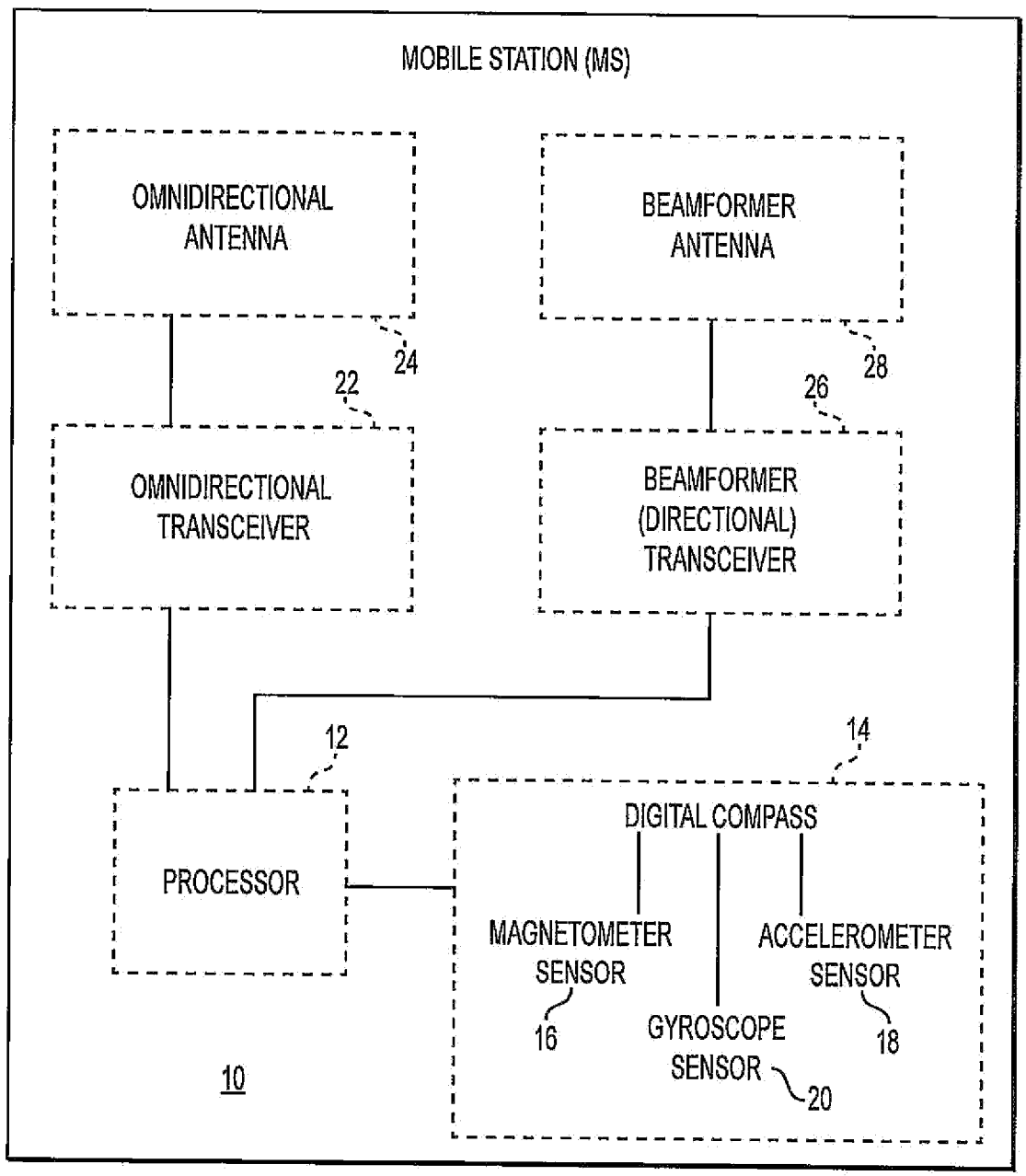
FIG. 6 is a block diagram of an exemplary mobile station for initial beam access in a mmWave cellular network.

FIG. 6 is a block diagram of a typical mobile station MS 10 in the present mmWave cellular network. The mobile station 10 includes a processor 12, which is connected to an omnidirectional transceiver 22, a beamformer transceiver 26, and a digital compass 14. The omnidirectional transceiver 22 is connected to an omnidirectional antenna 24, and the beamformer transceiver 26 is connected to a beamformer antenna 28, respectively. The digital compass 14 includes a magnetometer sensor 16, an accelerometer sensor 18, and a gyroscope sensor 20 for determining the mobile station's relative position, pitch, roll, etc. as it travels through the coverage area of the base station BS. When the mobile station 10 enters the coverage area of the base station BS, assuming that it is unable to contact the base station using a directional signal using the beamformer transceiver, the mobile station 10 scans the band with the low power omnidirectional transceiver 22 to see if there is another mobile station in the coverage area that has already established contact with the base station using a directional beamformer signal and is broadcasting the parameters needed to establish contact with the base station BS using a beamformer antenna 28. If no such signal is heard initially, the mobile station 10 may transmit beacons to other mobile stations in the area requesting such parameters. Once the parameters are received, the processor 12 uses the digital compass 14 to provide sensor data to adjust the parameters relative due magnetic north due to the relative movement of the two mobile stations, and activates the beamformer transceiver 26 to use the corrected parameters to attempt contact with the base station BS using a directional signal.

Figure 3:
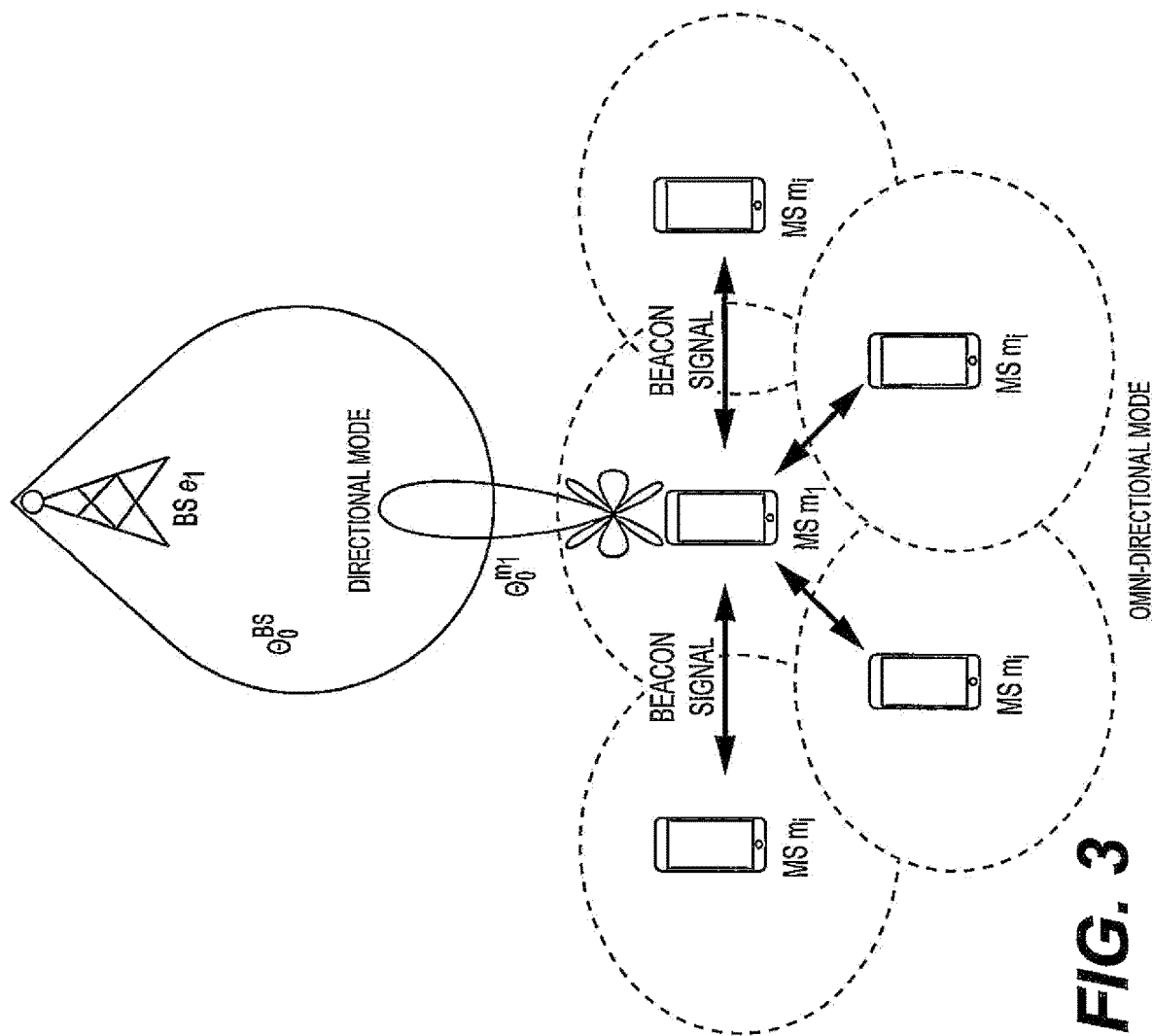
FIG. 3 is a schematic diagram of the architecture for establishing initial beam access in a mmWave cellular network in which a single MS $m_1$ (a primary MS) broadcasts a directional beacon to Multiple MSs seeking initial access.

FIG. 3 is an illustration of a single broadcasting approach from MS $m_1$ (a primary MS) to Multiple MSs. Only the primary MS $m_1$ broadcasts the BS $e_1$ coordinates through a beacon signal X($m_1$) to all the MSs in the cluster that fall within the coverage footprint of the omnidirectional antenna, making each MS $m_i$ in the cluster adjust its coordinates to this direction.

Beacon reception at M users from MS $m_1$ is initiated by receiving a signal at the secondary RF chain (Transceiver 2) for all MS $m_i \in$ M, which is expressed as, $$y(m_i) = \sqrt{pr(m_i)} H(m_1, m_i) X(m_1) c_1 + w, \quad (7)$$

where pr($m_i$) is the received signal power and H($m_1$, $m_i$) is the channel between $m_1$ and any $m_i \in$ M, expressed as, $$H(m_1, m_i) = \sqrt{\frac{N_{m_1} N_{m_2}}{\Gamma_{PL}}} \sum_{k=1}^{K} \sum_{l=1}^{L} h_1 P_{BS} V_{m_2}^H, \quad (8)$$

where N, is the total number of antennas at the MS $m_i$. Since only the MS $m_1$ broadcasts beacon signals and all other MS M listen to the same signal, this formulates a unidirectional transmission mode, and therefore, a single Hamming code associated with each cell and transmitted beacon signal from primary users, e.g., codes $c_1$ and $c_2$ along BS $e_1$ and BS $e_2$, respectively.

Likewise to $m_1$, any distant MS $m_i$ also uses an electronic compass to determine the direction for its beamforming vector, $\Theta_0^{m_i}$. This direction returns the highest signal level along m orientation for communicating with the BS, i.e., $$\Theta_0^{m_i} = |\varphi_{comp} - z_d| \pm \Delta\alpha. \quad (9)$$

Namely, each MS $m_i$ uses this information to determine the optimum direction for its beamforming vector, $\Theta_0^{m_i}$, which returns the highest signal level along the orientation of $m_i$ to communicate with the BS. The received signal from MS $m_1$ at the secondary RF chain of all MS $m_i \in$ M is expressed as, $$y(m_i) = \sqrt{pr(m_i)} H(m_1, m_i) X(m_1) c_1 + w, \quad (10)$$

where pr($m_i$) is the received signal power and H($m_1$, $m_i$) is the channel between $m_1$ and any $m_i \in$ M.

Figure 4:
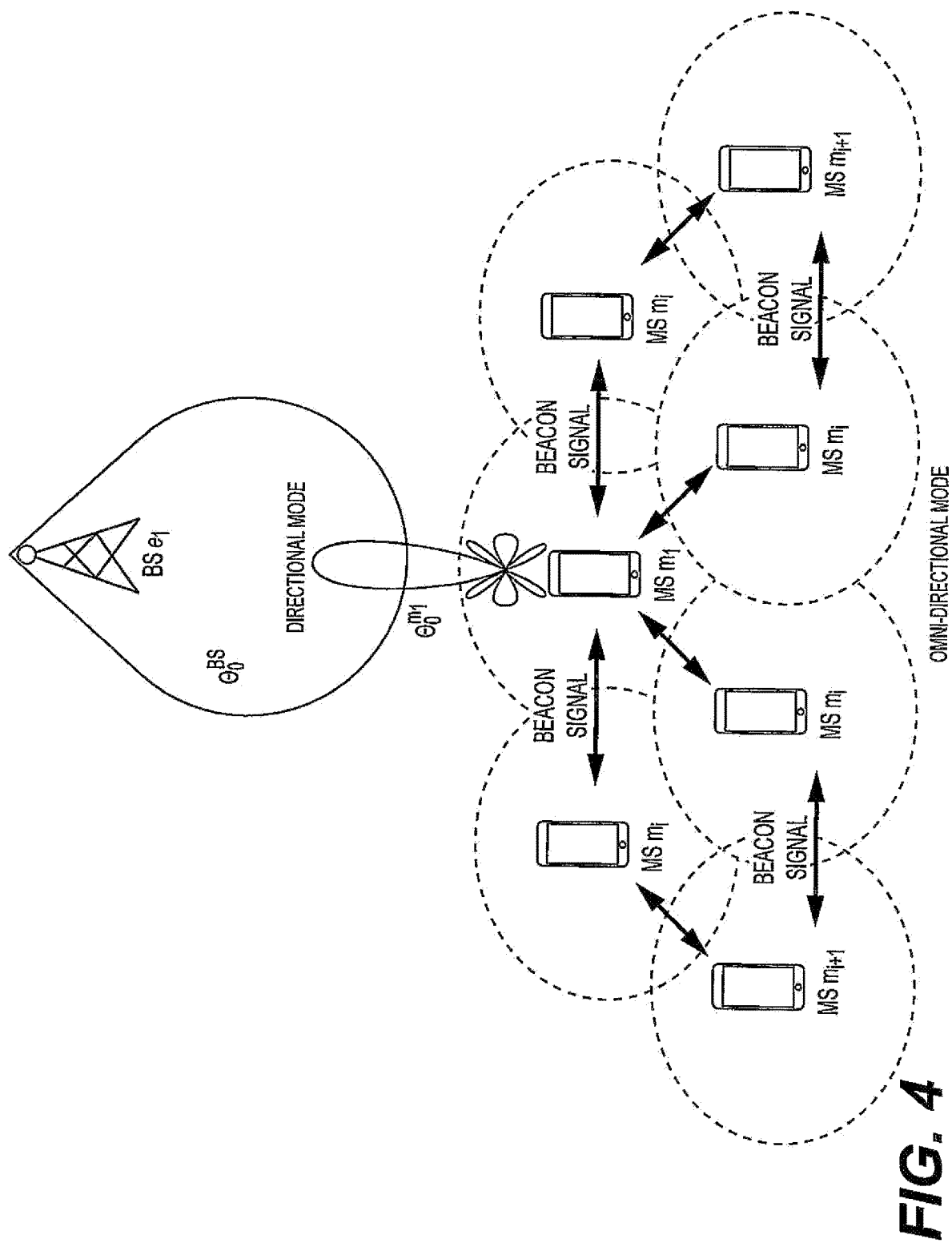
FIG. 4 is a schematic diagram of the architecture for establishing initial beam access in a mmWave cellular network in which multiple MSs broadcast a directional beacon to other MSWs seeking initial access.

FIG. 4 is a diagram of a multi-broadcasting approach from all associated MSs. Following the completion of the directional association for $m_i \in$ M users with the BS, each associated MS $m_i$ at previous time instances probes the established beamforming direction that yields in the highest signal level with the BS, which is accomplished by broadcasting a unique beacon signal X($m_i$) from each MS $m_i$, as shown in FIG. 4. Here each $m_i$ multiplies the transmitted signal by an orthogonal code $c_i \in$ C, i.e., to retrieve and distinguish the SoI. Therefore, the number of codes is equal to the number of associated MS $m_i$.

An incoming MS $m_i$ receives multiple beacon signals on Transceiver 2 from nearby devices when it joins the network. These beacon signals are decoded, and then the directions are computed as per the digital compass. Further, the signal quality is gauged for each of these directions, and the optimum signal level is selected following the paging process, where the MS $m_i$ selects the highest signal level from the received beacon signals. The received signal at the secondary RF chain (Transceiver 2) for any MS $m_i \in$ M is expressed as, $$y(m_i) = \sqrt{pr(m_i)} H(m_i, m_{i+1}) X(m_i) C + w. \quad (11)$$

The incoming MS $m_i$ receives multiple beacon signals that impinge on the antenna aperture. Following the decoding of beacon signals, the Signal-to-Interference plus-Noise Ratio (SINR) at MS $m_i$ from other users is expressed as, $$\Psi = \frac{pt(m_1) h(m_i, m_{i+1})}{\sum_m pt(m_i) h(m_i, m_{i+1}) + \sigma_w^2}, \quad (12)$$

where h($m_i$, $m_{i+1}$) denotes the channel gain between MS $m_1$ and MS $m_{i+1}$. Further, the sum form attributes for the cumulative interfering signal from other MSs.

In either of the broadcasting approaches, the varying separation distances between MS $m_1$ and multiple MSs M can yield in less accuracy and reduced signal level, albeit higher accuracy for nearby users, so each MS $m_1$ scans neighboring directions to $$\Theta_0^{m_i}$$

to enhance the detection accuracy in a process termed as a refinement search. Here MS $m_i$ gauges two additional signal $y(m_i)$ levels using Transceiver 2, i.e., on the first incremental $$(\Theta_{0^+}^{m_i})$$

and decremental beam directions $$(\Theta_{0^-}^{m_i})$$

to the deaconed direction $$\Theta_0^{m_i}$$

from MS $m_1$. This refinement search is formulated as, $$(\Theta^{BS}, \Theta^{m_i})_{opt} \big| = \max |y(m_i)|, \text{ s.t. } \Theta_0^{m_i} \in \{\Theta_0^{m_i}, \Theta_{0^-}^{m_i}, \Theta_{0^+}^{m_i}\}. \quad (13)$$

Thereafter, each MS can now communicate with the target BS using the retrieved spatial directions.

Figure 5:
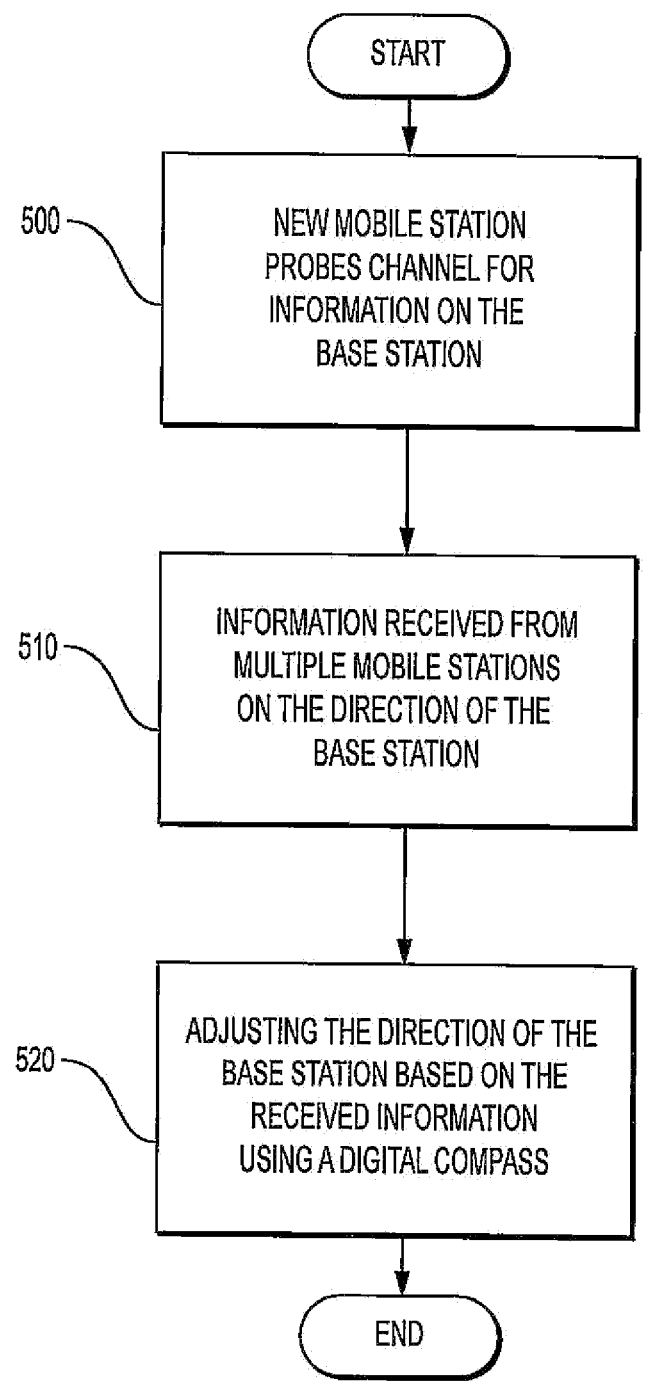
FIG. 5 is a flowchart of an initial beam access method for a mobile station in a mmWave cellular network having a base station and multiple mobile stations.

FIG. 5 is a flowchart of an initial beam access method for a mobile station in a mmWave cellular network having a base station and multiple mobile stations. In step 500, when a new mobile station joins a network, a channel is probed for information about the base station from the multiple mobile stations already present on the network. In some embodiments the channel is probed for beacon signals from the multiple mobile stations about the base station using a low-power omnidirectional signal.

In step 510 information is received from the multiple mobile stations on the direction of the base station in relevance to a reference point. Multiple neighboring mobile stations send broadcast information on the channel about the direction of the base station.

The direction of the base station in step 520 is adjusted based on the received information and the reference point using a digital compass. A beamformer adjusts the direction of the base station using positional information of the mobile station, such as the azimuth, tilt, horizontal plane, accelerometer rotation angles, roll and pitch angles, azimuth error, inclination angle of the magnetic vector, and roll and pitch angle errors.

It is to be understood that the system and method for doing something is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An initial beam access method for a mobile station in a mmWave cellular network having a base station and multiple mobile stations, the method comprising the steps of:
   upon entering a coverage area of a base station transmitting a directional signal from a beamforming antenna array, probing the coverage area with a low power omnidirectional antenna for directional signal parameters for contacting the base station provided by at least one of the multiple mobile stations already in the coverage area;
   receiving the directional signal parameters from at least one of the multiple mobile stations;
   adjusting the directional signal parameters received from the at least one of the multiple mobile stations using a digital compass to obtain reference parameters relative to magnetic north; and
   inputting the adjusted reference parameters to the mobile station's beamforming antenna to make contact with the base station.

2. The initial beam access method as recited in claim 1, wherein probing the coverage area comprises probing for beacon signals from at least one of the multiple mobile stations about the base station direction.

3. The initial beam access method as recited in claim 1, wherein probing the coverage area comprises using a low-power omnidirectional signal.

4. The initial beam access method as recited in claim 1, wherein receiving information comprises receiving broadcast information on the coverage area from a least one neighboring mobile station about the direction of the base station.

5. The initial beam access method as recited in claim 1, wherein the direction of the base station is provided relative to a north magnetic field direction.

6. The initial beam access method as recited in claim 1, wherein adjusting the direction of the base station comprises adjusting to a directional beamformer signal using positional information of the mobile station.

7. The initial beam access method as recited in claim 6, wherein the positional information is at least one of the azimuth, tilt, horizontal plane, accelerometer rotation angles, roll and pitch angles, azimuth error, inclination angle of the magnetic vector, and roll and pitch angle errors.

8. A method for providing initial beam access in a mmWave cellular network, the network comprising:
   a base station configured for transmitting a directional signal beam through a beamformer array;
   a plurality of mobile stations, each of the mobile stations being configured for communicating with the base station through a beamformer antenna, configured for communicating with neighboring mobile stations by low power omnidirectional transmission and configured with a digital compass for locating the base station's beamformer array relative to magnetic north,
   the method for providing initial beam access to the base station comprising:
   the step of a single one of the plurality of mobile stations already in contact with the base station transmitting parameters for communicating with the base station's beamformer array to a single neighboring mobile station by low power omnidirectional signal.

9. A method for providing initial beam access in a mmWave cellular network, the network comprising:
   a base station configured for transmitting a directional signal beam through a beamformer array;
   a plurality of mobile stations, each of the mobile stations being configured for communicating with the base station through a beamformer antenna, configured for communicating with neighboring mobile stations by low power omnidirectional transmission and configured with a digital compass for locating the base station's beamformer array relative to magnetic north, the method for providing initial beam access to the base station comprising:

the step of a single one of the plurality of mobile stations already in contact with the base station transmitting parameters for communicating with the base station's beamformer array to a multiple neighboring mobile stations by low power omnidirectional signal.

10. A method for providing initial beam access in a mmWave cellular network, the network comprising:

a base station configured for transmitting a directional signal beam through a beamformer array;

a plurality of mobile stations, each of the mobile stations being configured for communicating with the base station through a beamformer antenna, configured for communicating with neighboring mobile stations by low power omnidirectional transmission and configured with a digital compass for locating the base station's beamformer array relative to magnetic north, the method for providing initial beam access to the base station comprising: the step of a multiple ones of the plurality of mobile stations already in contact with the base station transmitting parameters for communicating with the base station's beamformer array to multiple neighboring mobile stations by low power omnidirectional signal.

* * * * *